(12) United States Patent
Cardin

(10) Patent No.: US 8,136,769 B2
(45) Date of Patent: Mar. 20, 2012

(54) CABLE TRAY SUPPORT ASSEMBLY

(75) Inventor: Daniel Cardin, Sainte-Julie (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/873,459

(22) Filed: Sep. 1, 2010

(65) Prior Publication Data

US 2011/0076094 A1 Mar. 31, 2011

Related U.S. Application Data

(60) Provisional application No. 61/247,244, filed on Sep. 30, 2009.

(51) Int. Cl.
  *F16L 3/00* (2006.01)
(52) U.S. Cl. .......................................... 248/49
(58) Field of Classification Search ............ 278/49, 278/72, 73, 68.1; 403/309, 306; 174/135, 174/136
See application file for complete search history.

(56) References Cited

U.S. PATENT DOCUMENTS

| | | | |
|---|---|---|---|
| 2,470,788 A | 5/1947 | O'Brien et al. | |
| 3,448,955 A | 6/1969 | Fussell | |
| 4,078,752 A | 3/1978 | Kindorf | |
| 4,516,874 A | 5/1985 | Yang et al. | |
| 5,100,086 A | 3/1992 | Rinderer | |
| 5,123,618 A | 6/1992 | Guterman et al. | |
| 5,316,244 A | 5/1994 | Zetena et al. | |
| 5,323,988 A | 6/1994 | Handler | |
| 5,372,341 A * | 12/1994 | Witherbee et al. | 248/49 |
| 5,580,014 A * | 12/1996 | Rinderer | 248/49 |
| RE35,479 E | 3/1997 | Witherbee et al. | |
| 5,639,048 A | 6/1997 | Bartholomew et al. | |
| 5,661,263 A | 8/1997 | Salvaggio | |
| 6,000,187 A | 12/1999 | Shimizu | |
| 6,143,984 A | 11/2000 | Auteri | |
| 6,483,025 B1 | 11/2002 | Samsi et al. | |
| 6,521,835 B1 | 2/2003 | Walsh | |

(Continued)

FOREIGN PATENT DOCUMENTS

| | | |
|---|---|---|
| CA | 2 083 034 | 5/1993 |
| CA | 2 137 879 | 6/1995 |
| CA | 2 167 653 | 7/1996 |
| CA | 2 412 399 | 5/2004 |
| CA | 2 547 139 | 11/2006 |

OTHER PUBLICATIONS

Range Rack, Brochure #2, Serie BT 2006, pp. 2-1 to 2-4. Range Rack, Brochure #7, Serie Bw 2006, pp. 7-1 to 7-4.
Range Rack, Brochure #20, Accessoires 2006, pp. 20-1 to 20-8.

*Primary Examiner* — Ramon Ramirez
(74) *Attorney, Agent, or Firm* — Snyder, Clark, Lesch & Chung, LLP

(57) ABSTRACT

A reinforcing structure is provided for supporting a joint of two cable tray sections, wherein each of the two cable tray sections includes a side rail having a planar body member, a bottom edge and a top edge, and wherein the joint is positioned over a structural support member. The reinforcing structure may include a top member; a body member extending substantially perpendicularly from the top member; and a bottom member extending substantially perpendicularly from the body member. The bottom member may be configured for mounting on the structural support member. The bottom member may be configured to receive the bottom edge of the side rail. The top member may include an inside edge configured to support the planar body member of the side rail when the bottom edge of the side rail is received into the bottom member.

20 Claims, 4 Drawing Sheets

U.S. PATENT DOCUMENTS

| | | |
|---|---|---|
| 7,151,222 B1 | 12/2006 | Jetton |
| 7,380,757 B2 | 6/2008 | Paunescu et al. |
| 7,383,634 B2 | 6/2008 | Haataja et al. |
| 2003/0116682 A1* | 6/2003 | Finco et al. .................... 248/49 |
| 2006/0169849 A1* | 8/2006 | Saavedra ...................... 248/49 |
| 2010/0181438 A1* | 7/2010 | Chauzu et al. ................. 248/49 |
| 2011/0013978 A1* | 1/2011 | Smith et al. .................. 403/306 |

* cited by examiner

CABLE TRAY SUPPORT ASSEMBLY

CROSS-REFERENCE TO RELATED APPLICATION

This application claims priority under 35. U.S.C. §119, based on U.S. Provisional Patent Application No. 61/247,244 filed Sep. 30, 2009, the disclosure of which is hereby incorporated by reference herein.

BACKGROUND OF THE INVENTION

In the construction of various types of buildings, factories, and other commercial structures, extensive networks of cables and conduits are needed for a variety of purposes. Such purposes may include the provision of electrical power, the transmission of communication and data signals, and the transportation of fluids such as gases or liquids. Such transmission is achieved via the use of electrical cables and other conduits, which are routed throughout the structure. It can be appreciated that due to the size, number and complexity of cables and conduits that are used in many modern commercial structures, the efficient routing of such cables and conduit may be rendered difficult.

Cable tray systems have been used to effectively manage the routing of such cables and conduits. As defined by the National Electrical Code, a cable tray system is an assembly of units or sections and associated fittings forming a rigid structural system used to support cables.

Cable tray systems may take a variety of shapes and forms but common to all such systems are a pair of spaced apart elongate sidewalls or rails between which the cables or conduits are supported. The cables or conduits may be secured to solid bottom trays (troughs) or spaced apart rungs that span the side rails and provide a surface on which the cables or conduits may be mounted. The cable tray may be supported at various levels above ground by use of overhead supports, floor-mounted supports or by extending the tray along the wall of a structure. The cable trays are permitted to extend transversely through partitions in walls to permit routing of cables and conduits to various locations within the structure.

DETAILED DESCRIPTION OF THE PREFERRED EMBODIMENTS

The following detailed description refers to the accompanying drawings. The same reference numbers in different drawings may identify the same or similar elements.

Consistent with implementations described herein, an improved cable tray system for supporting cables and conduits may be provided. Cable tray systems disclosed herein may support various types of cables and conduits such as electrical cables, communications cables, various types of fluid conduits, pipes and the like. Notwithstanding such uses, the device of the present invention is commonly referred to as a "cable" tray even though conduits other than cables may also be supported thereby. Accordingly, as the term is used herein for simplicity, the term "cable" will also denote all types of cables and conduits that may be supported in a cable tray in a manner set forth and described below.

Further, although the following description and figures disclose a cable tray having a particular construction (e.g., a trough type cable tray), other construction types may also be used with the present invention. Also, cable trays described herein may be formed of a wide variety of materials well known in the cable tray art. Common materials useful in forming cable trays are, for example, aluminum, steel, and stainless steel.

Figure 1:
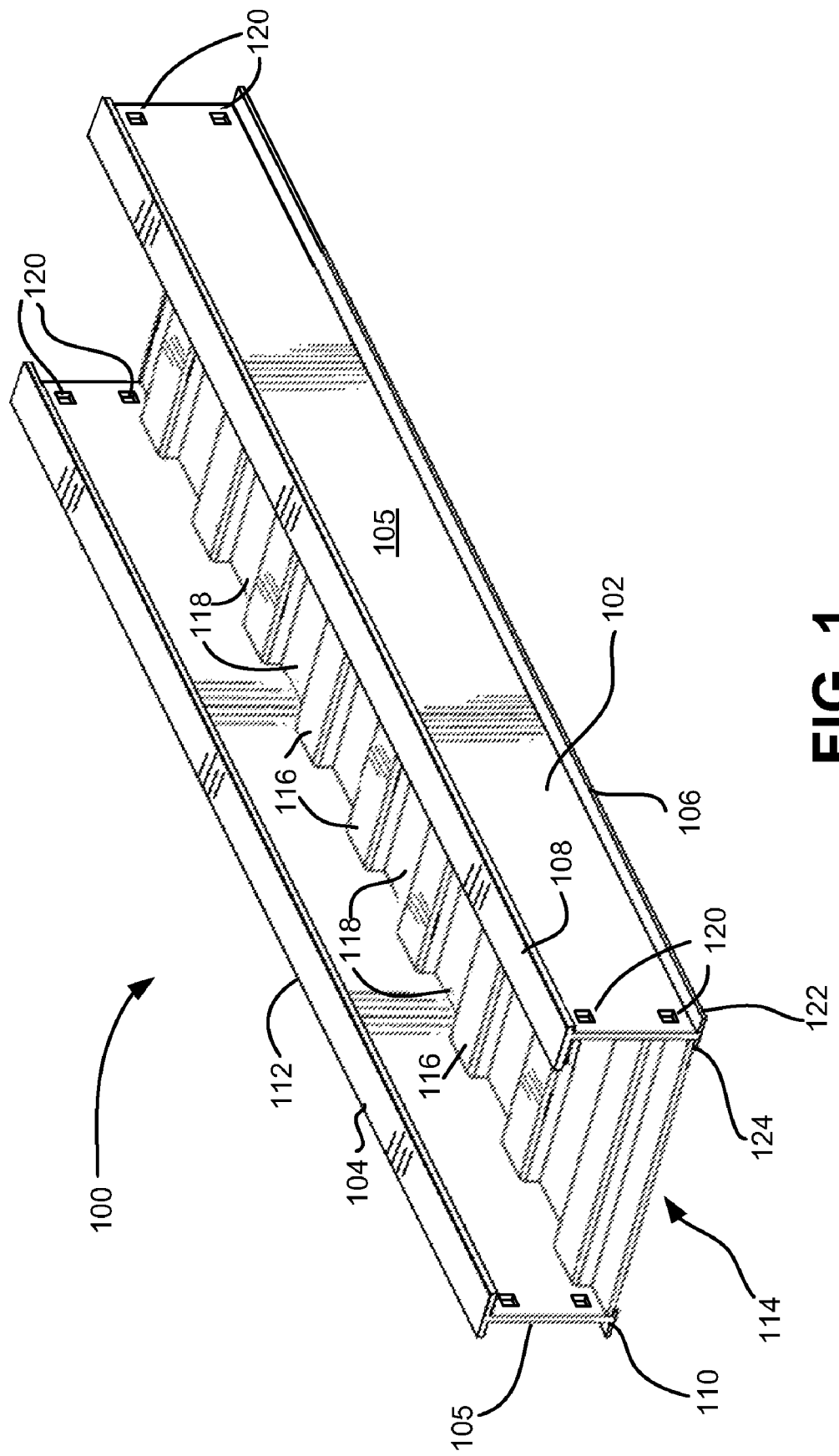
FIG. 1 is an isometric illustration of an exemplary cable tray consistent with implementations described herein.

FIG. 1 is an isometric illustration of a cable tray 100 consistent with implementations described herein. As shown, cable tray 100 may include a pair of elongate, transversely spaced, longitudinally extending side rails 102 and 104. Rails 102 and 104 may include elongate, generally planar body members 105 having transversely directed bottom edges 106 and 110 respectively, as well as transversely directed upper edges 108 and 112, respectively. In this manner, each of rails 102/104 may define a substantially I-beam-like configuration that imparts substantial rigidity to rails 102/104. Transversely directed bottom edges 106/110 may include an outwardly extending lip 122 and an inwardly extending lip 124. In one implementation, outwardly extending lip 122 may have a width greater than a width of inwardly extending lip 124.

A solid corrugated base 114 may extend between spaced apart rails 102 and 104 and may form a generally U-shaped trough. Base 114 is supported on transversely directed bottom edges 106 and 110. Base may be secured to rails 102/104 using any suitable means, such as welding or fastener systems. Opposing ends of each rail 102 and 104 may include fastener openings 120 for receiving fastening elements therethrough. As will be described in detail below, splice plates may be attached to two cable trays 100 via fastener openings 120 to facilitate the joining of successive cable tray sections.

As illustrated in FIG. 1, base 114 may include, in corrugated fashion, a plurality of spaced apart transversely extending raised cable support surfaces 116. In one implementation, recessed lower surfaces 118 may be formed between each raised cable support surface 116. As illustrated, lower surfaces 118 may lie in a plane that is vertically spaced from the plane in which cable support surfaces 116 lie. Thus, cable support surfaces 116 may provide a raised surface that directly supports a longitudinal extent of a cable or bundle of cables placed thereon.

In other implementations consistent with embodiments described herein, cable tray 100 may include a ladder-type configuration. In such a configuration (not shown), base 114 may include longitudinally spaced apart support surfaces 116 (possibly referred to as "support rungs" in a ladder-type cable tray configuration), but may not include the lower surfaces 118 illustrated in FIG. 1.

In conventional cable tray systems, splice plates may be used to join cable tray sections together (e.g., via fastener openings 120). Further, to protect against damage to the cable tray system caused by environmental temperature fluctuations and possible seismic activity, splice plates may be configured to allow expansion and contraction of the joint.

In some situations, in setting up and installing cable tray systems, it may be necessary or advantageous to splice together or join cable tray sections at locations that correspond to locations of structural support members (e.g., steel beams, etc.) depending on installation requirements, construction type, etc. For example, twenty foot sections of cable tray may be laid over structural support members positioned twenty feet apart.

Unfortunately, conventional splice plates used to join cable tray sections in such systems are generally ineffective for use when the joint overlies a structural support member. For example, pressures exerted on the joint and the splice plate by the structural support member may cause the splice plate to fail or become damaged.

Figure 2:
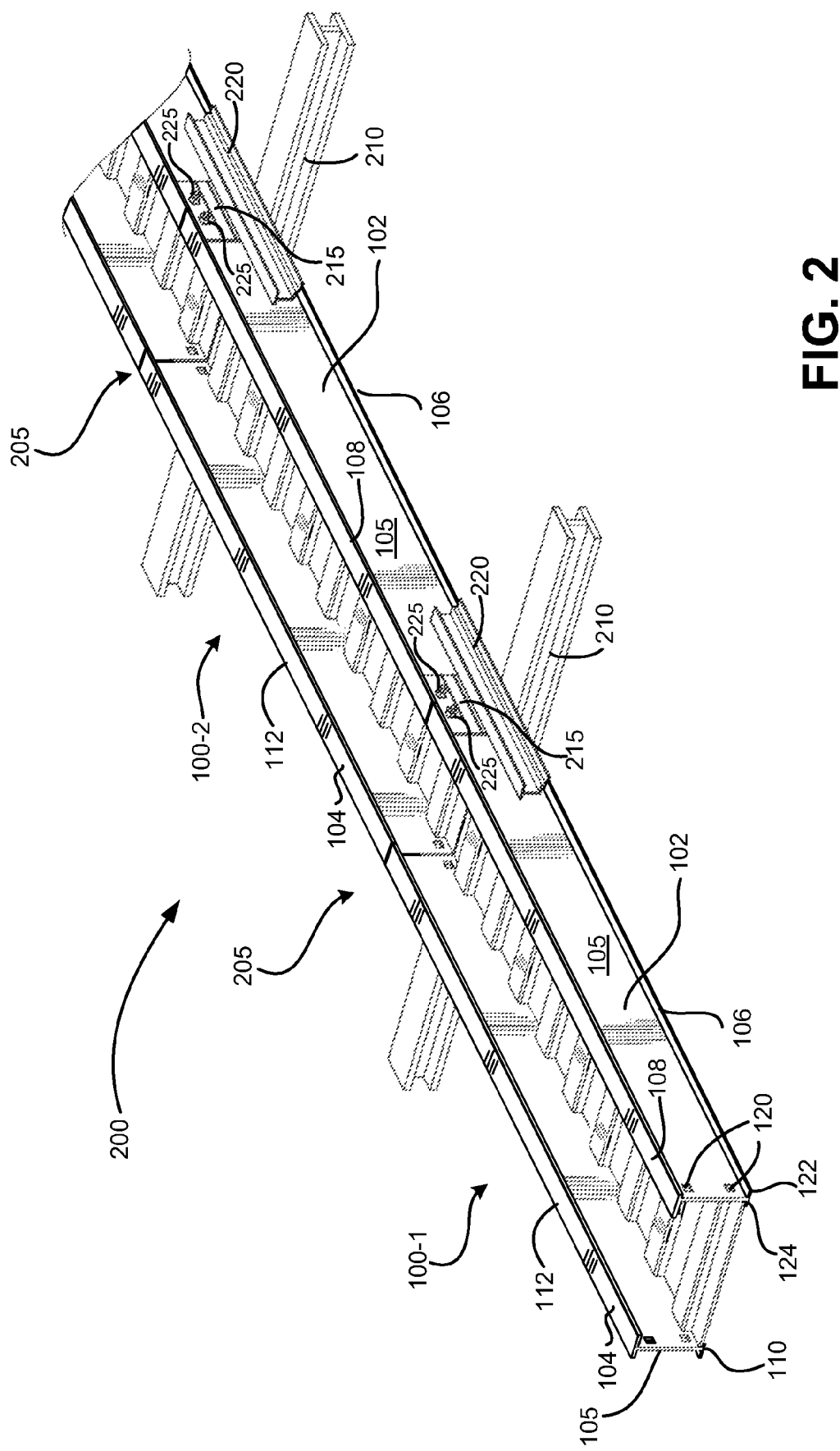
FIG. 2 is a diagram illustrating an exemplary cable tray system incorporating the cable tray of FIG. 1.

Consistent with embodiments described herein, a cable tray system is provided that enables splicing of cable tray sections at joints that overlay structural support elements. FIG. 2 is a diagram illustrating a cable tray system 200 in which multiple cable trays 100-1 and 100-2 are joined together in a longitudinal manner at a joint 205 that corresponds to and overlies structural support member 210.

Figure 3:
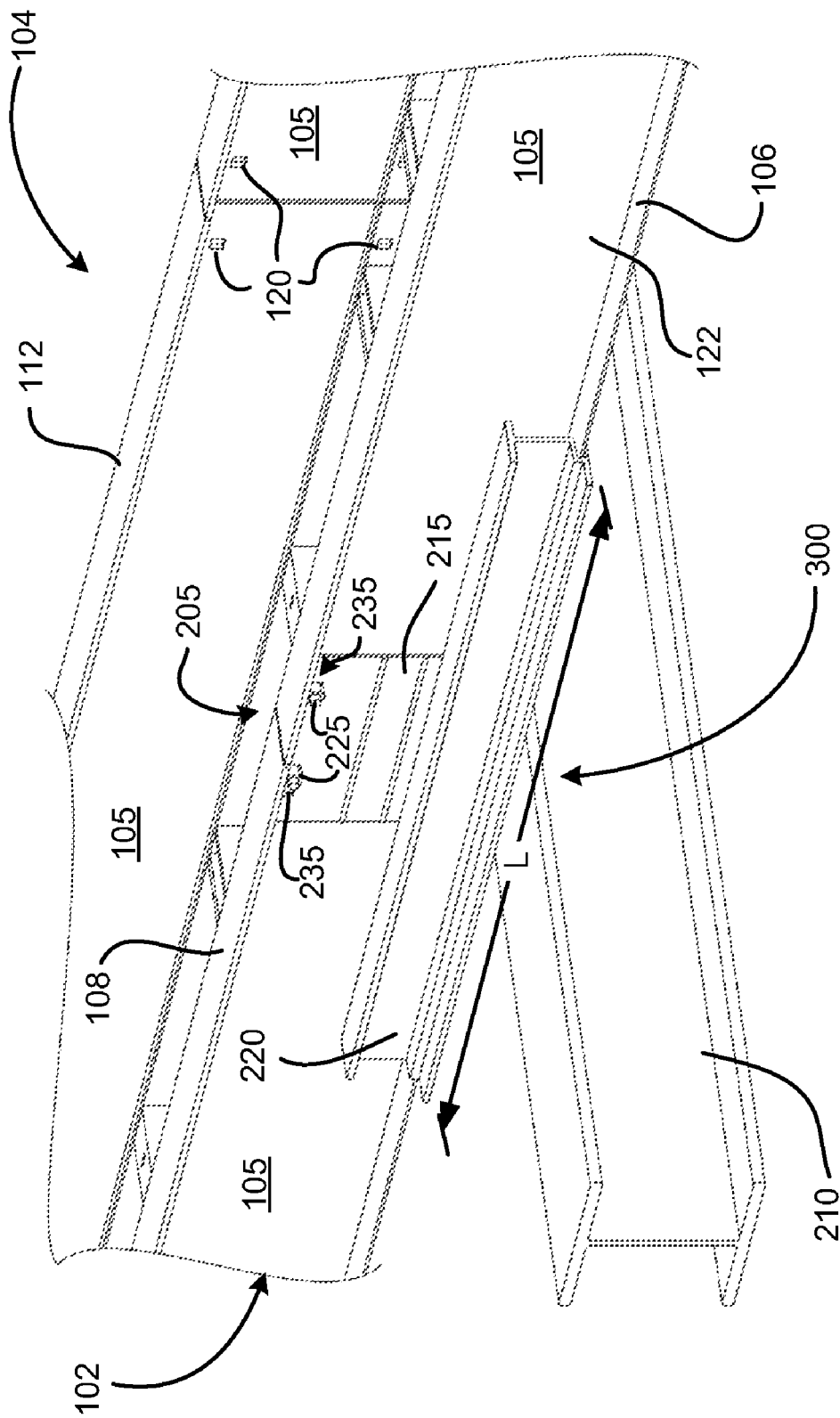
FIG. 3 is an enlarged isometric diagram of an exemplary cable tray joint of FIG. 2.
Figure 4:
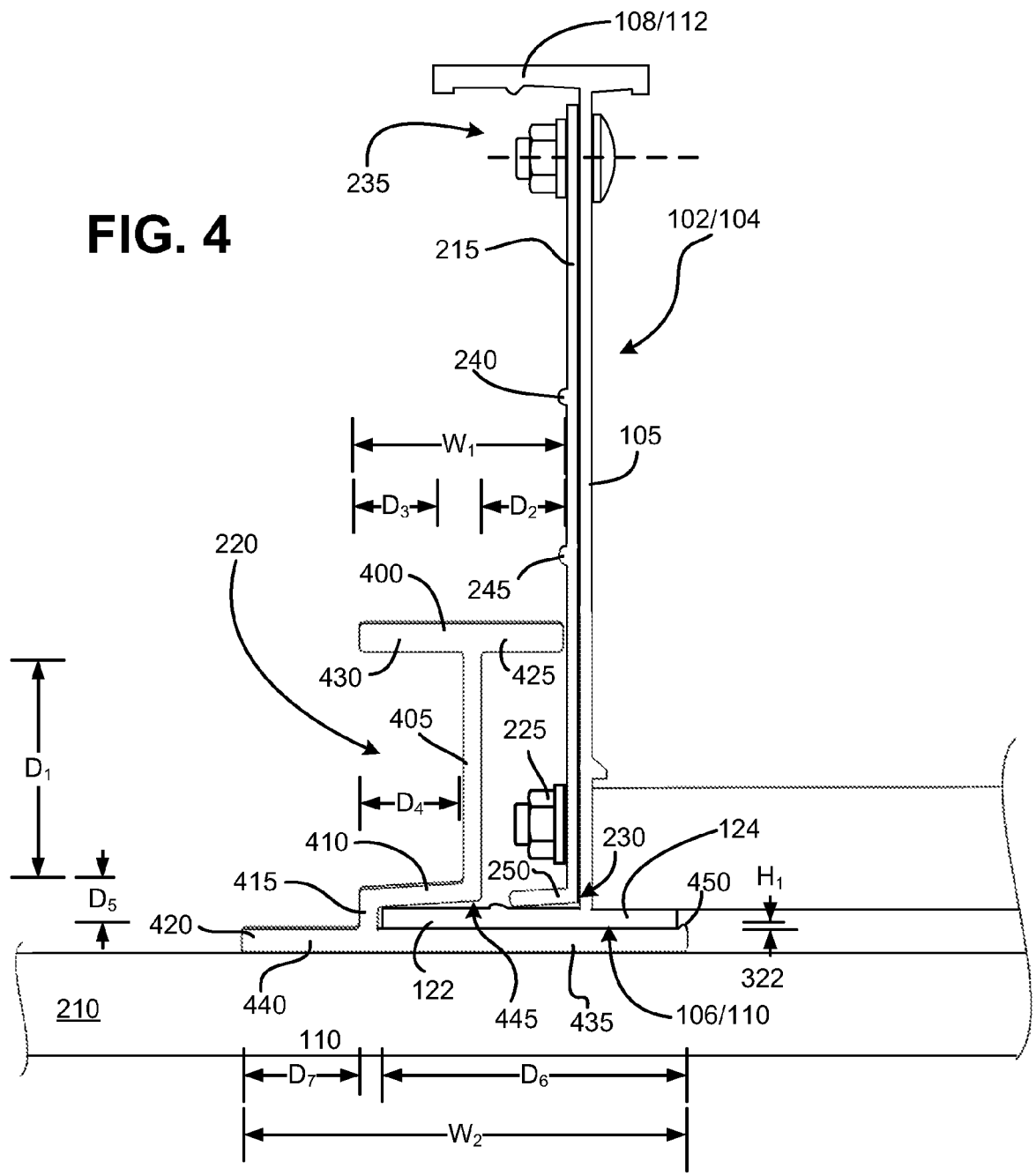
FIG. 4 is a cross-sectional view of the cable tray joint of FIGS. 2 and 3.

FIG. 3 is an enlarged isometric diagram of a joint 205 of cable tray system 200. FIG. 4 is a cross-sectional view of joint 205 of cable tray system 200. As illustrated in FIGS. 2-4, in addition to adjacent cable trays 100-1/100-2, joint 205 may include a structural support member 210, a splice plate 215, a reinforcing beam 220, and fastening elements 225 connected to side rails 104 of cable trays 100-1 and 100-2. Although only single instances of splice plate 215 and reinforcing beam 220 are shown in FIGS. 2-4, it should be understood that, in practice, joint 205 may include another instance of splice plate 215 and reinforcing beam 220 connected to side rails 102.

Consistent with embodiments described herein, splice plate 215 may be formed of a rigid material (e.g., aluminum, steel, stainless steel, etc.) and may include a substantially rectangular configuration have a bottom edge 230, fastener openings 235 (only two of which are shown in FIG. 3), upper reinforcement bead 240, and intermediate reinforcement bead 245 (FIG. 4). As shown in FIG. 4, bottom edge 230 may include a flange or angle 250 extending perpendicularly to the remainder of splice plate 215. Angle 250 may provide increased rigidity to splice plate 215 when attached to side rails 102 at joint 205. In one exemplary embodiment, angle 250 may extend approximately 1 inch from the remainder of splice plate 215.

Fastener openings 235 may include substantially rectangular or oblong (e.g., elongated) cutouts in a surface of splice plate 215, the locations of which correspond to fastener openings 120 on cable tray 100-1 and 100-2.

In some instances, it may be necessary to allow for expansion and contraction of components of cable tray system 200. In such an implementation (e.g., "an expansion embodiment"), two of fastener openings 235 may be provided with a non-square, rectangular, or oblong configuration, while the remaining fastener openings 235 are provided with a substantially square or circular configuration. For example, two of fastener openings 235 may include a 1 inch by 2 inch openings, where the 2 inch widths are in a longitudinal direction with respect to cable trays 100-1 and 100-2. In this embodiment, the remaining fastener openings 235 as well as fastener openings 120 in cable trays 100-1 and 100-2 may include 1 inch by 1 inch openings. In such an implementation, upon insertion of fastening elements 225, longitudinal movement (e.g., expansion) of cable tray 100-1 relative to cable tray 100-2 of as much as 1 inch may be facilitated by splice plate 215 about fastening elements 225.

In an embodiment that does not allow for expansion of cable trays 100-1 and 100-2 (e.g., "a non-expansion embodiment"), each of fastener openings 235 in splice plate 215 and fastener openings 120 in cable trays 100-1 and 100-2 may be provided with a substantially square or circular configuration, thereby fixing the position of cable tray 100-1 relative to cable tray 100-2 upon insertion of fastening elements 225.

Upper reinforcement bead 240 and intermediate reinforcement bead 245 may also provide increased rigidity to splice plate 215. In one implementation, each of reinforcing beads 240 and 245 may include substantially hemispherical protrusions extending longitudinally across splice plate 215.

As illustrated in FIGS. 3 and 4, reinforcing beam 220 may include an elongate structure configured for attachment on an outside surface of rails 102/104 (e.g., on exterior, opposing surfaces of sides of rails 102/104). In one implementation, as shown in FIGS. 2 and 3, reinforcing beam 220 may have a length L and may be positioned such that an intermediate portion 300 of reinforcing beam 220 may be located proximate to joint 205. In one exemplary embodiment, length L may be approximately 24 to 60 inches. As will be discussed below in relation to FIG. 4, reinforcing beam 220 may be configured to engage splice plates 215 and bottom transverse edges 106/110 of side rails 102/104 of joined cable trays 100-1 and 100-2 proximate to joint 205. Consistent with embodiments described herein, reinforcing beam 220 may be formed of a rigid material (e.g., aluminum, steel, stainless steel, etc.).

Reinforcing beam 220 may include a top member 400, a first body member portion 405, a second body member portion 410, a third body member portion 415, and a bottom member 420. As illustrated in FIG. 4, top member 400 may form a T-shaped connection with first body member portion 405 and may extend a distance $D_1$ from a bottom surface of top member 400. In one exemplary embodiment, distance $D_1$ may be approximately 1-3 inches. Top member 400 may have width $W_1$ and may include an inside edge 425 formed a distance $D_2$ from an inside surface of first body member portion 405 and an outside edge 430 formed a distance $D_3$ from an outside surface of first body member portion 405. That is, top member 400 may be formed transversely with respect to first body member portion 405. In one exemplary embodiment, width $W_1$ may be approximately 1.0-3.0 inches, distance $D_2$ may be approximately 0.25 to 1.5 inches, and distance $D_3$ may be approximately 0.25 to 1.5 inches.

Second body member portion 410 may be formed substantially perpendicularly to first body member portion 405 and may extend outward from first body member portion 405 a distance $D_4$ from the outside surface of first body member 405. In one exemplary embodiment, distance $D_4$ may be approximately 0.25-1.5 inches. Third body member portion 415 may be formed substantially perpendicularly to second body member portion 410 may extend downwardly from a second body member portion 410 a distance $D_5$. In one exemplary embodiment, distance $D_5$ may be approximately 0.10-1.0 inches.

Bottom member 420 may be formed substantially perpendicularly to third body member portion 415 and may extend transversely with respect to third body portion 415. Bottom member 420 may have a width $W_2$ and may include an inside edge 435 formed a distance $D_6$ from third body member portion 415 and an outside edge 440 formed a distance $D_7$ from third body portion 415. In one exemplary embodiment, width $W_2$ may be approximately 2.0-3.5 inches, distance $D_6$ may be approximately 0.50 to 2.0 inches, and distance $D_7$ may be approximately 0.25 to 1.5 inches. As shown in FIG. 4, second body portion 410, third body portion 415, and inside edge 435 of bottom member 420 may be configured to form a cavity 445 therebetween. Further, in one implementation, inside edge 435 may include a knob or vertical protrusion 450 extending upwardly from a distal end thereof. Protrusion 450 may have a height $H_1$ from an upper surface of bottom member 420. In one implementation, height $H_1$ may be approximately 0.125 to 0.25 inches.

As illustrated in FIG. 4, cavity 445 may be configured to slidingly receive bottom edge 106/110 of rail 102/104 therein. When fully positioned, inside edge 435 of bottom member 420 may be positioned over structural support member 210 and under bottom edge 106/110 of rail 102/104 such that bottom edge 106/110 is positioned between protrusion 450 and third body portion 415. In this manner, reinforcing beam 220 may be securely attached between cable trays 100-1 and 100-2 and structural support member 210. Furthermore, by providing protrusion 450 on bottom member 420, it may be easily determined whether reinforcing beam 220 is properly attached to rail 102/104.

As shown in FIG. 4, when assembled, top member 400 may be sized such that an end of inside edge 425 of top member 400 is configured to abut or an outside surface of splice plate 215. In other implementations, inside edge 425 may be configured to be positioned within close proximity to splice plate 215, such that flexure or movement of rails 102/104 relative to each other may cause inside edge 425 to abut splice plate 215.

By providing rigid reinforcing beam 220 for secure attachment to multiple cable tray sections proximal to joint 215 overlying structural support member 210, expansion and non-expansion splice plates 215 may be used without risk of insufficient structural integrity. More specifically, by providing rigid reinforcing beam 220 with a member (e.g., top member 400) configured to abut slice plate 215 upon attachment to the cable tray sections, flexure or buckling of the splice plate may be avoided.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to cable tray 100 and cable tray system 200. In other implementations, features described herein may be implemented in relation to other support structure technologies, such as trusses, floor joists, etc.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A reinforcing structure for supporting a joint of two cable tray sections, wherein each of the two cable tray sections includes a side rail having a planar body member, a bottom edge and a top edge, and wherein the joint is positioned over a structural support member, comprising:
   a top member;
   a body member extending substantially perpendicularly from the top member; and
   a bottom member extending substantially perpendicularly from the body member,
   wherein the bottom member is configured for mounting on the structural support member,
   wherein the body member and the bottom member are configured to form a cavity therebetween to receive the bottom edge of the side rail, and
   wherein the top member includes an inside edge configured to support the planar body member of the side rail when the bottom edge of the side rail is received into the bottom member.

2. The reinforcing structure of claim 1,
   wherein the bottom member extends transversely from the body member and includes an inside edge and an outside edge,
   wherein the inside edge of the bottom member includes a protrusion extending therefrom at a position distal from the body member, and
   wherein the body member, the inside edge of the bottom member, and the protrusion form the cavity for receiving the bottom edge of the side rail.

3. The reinforcing structure of claim 1, wherein the top member extends transversely with respect to the body member and includes the inside edge and an outside edge.

4. The reinforcing structure of claim 1, wherein the body member comprises:
   a first body member portion extending substantially perpendicularly from the top member;
   a second body member portion extending substantially perpendicularly from the first body member portion; and
   a third body member portion extending substantially perpendicularly from the second body member portion,
   wherein the bottom member extends transversely from the third body member.

5. The reinforcing structure of claim 4,
   wherein the second body member portion, the third body member portion, the inside edge of the bottom member, and the protrusion form the cavity for receiving the bottom edge of the side rail.

6. The reinforcing structure of claim 1, wherein the top member, the body member, and the bottom member have a length ranging from 24 inches to 60 inches.

7. The reinforcing structure of claim 1, wherein the top member, the body member, and the bottom member are integrally formed of a rigid material.

8. The reinforcing structure of claim 1, wherein the rigid material comprises aluminum, steel, or stainless steel.

9. A reinforcing structure for supporting a joint of two cable tray sections, wherein each of the two cable tray sections includes a side rail having a planar body member, a bottom edge and a top edge, comprising:
   a top member;
   a body member extending substantially perpendicularly from the top member;
   a bottom member extending substantially perpendicularly from the body member; and
   a splice plate configured for attachment to the side rails of the two cable tray sections,
   wherein the bottom member is configured for mounting on the structural support member,
   wherein the bottom member is configured to receive the bottom edge of the side rail,
   wherein the top member includes an inside edge configured to support the planar body member of the side rail when the bottom edge of the side rail is received into the bottom member, and
   wherein the inside edge of the reinforcing structure is configured to abut an outside surface of the splice plate.

10. The reinforcing structure of claim 9, wherein the splice plate includes a plurality of fastener openings, wherein at least some of the plurality of fastener openings comprise elongated openings for allowing movement of one of the two cable tray sections relative to the other of the two cable tray sections.

11. A cable tray system, comprising:
a first cable tray section including a first side rail having a first planar body member, a first bottom edge and a first top edge;
a second cable tray section including a second side rail having a second planar body member, a second bottom edge and a second top edge;
a splice plate configured for attachment to the first side rail and the second side rail; and
a reinforcing beam for supporting the first cable tray section, the second cable tray section, and the splice plate when the first and second cable trays are positioned over a structural support member,
wherein the reinforcing beam comprises:
a top member;
a body member extending substantially perpendicularly from the top member; and
a bottom member extending substantially perpendicularly from the body member,
wherein the bottom member is configured for mounting on the structural support member,
wherein the bottom member is configured to receive the first bottom edge of the first side rail and the second bottom edge of the second side rail, and
wherein the top member includes an inside edge configured to support the splice plate when first bottom edge of the first side rail and the second bottom edge of the second side rail are received into the bottom member of the reinforcing beam.

12. The system of claim 11, wherein the splice plate includes a plurality of fastener openings, wherein at least some of the plurality of fastener openings comprise elongated openings for allowing movement of the first cable tray section relative to the second cable tray section.

13. The system of claim 11,
wherein the bottom member of the reinforcing beam extends transversely from the body member and includes an inside edge and an outside edge,
wherein the inside edge of the bottom member includes a protrusion extending therefrom at a position distal from the body member, and
wherein the body member, the inside edge of the bottom member, and the protrusion form a cavity for receiving the first and second bottom edges of the first and second side rails, respectively.

14. The system of claim 11, wherein the top member extends transversely with respect to the body member and includes the inside edge and an outside edge.

15. The system of claim 11, wherein the body member comprises:
a first body member portion extending substantially perpendicularly from the top member;
a second body member portion extending substantially perpendicularly from the first body member portion; and
a third body member portion extending substantially perpendicularly from the second body member portion,
wherein the bottom member extends transversely from the third body member.

16. The system of claim 11, wherein the top member, the body member, and the bottom member have a length ranging from 24 inches to 60 inches.

17. The system of claim 11, wherein the top member, the body member, and the bottom member are integrally formed of aluminum, steel, or stainless steel.

18. A device for supporting a cable tray expansion joint formed over a structural support member, comprising:
a top member for abutting a splice plate joining a first cable tray section and a second cable tray section;
a body member extending substantially perpendicularly from the top member; and
a bottom member formed transversely to the body member,
wherein the bottom member is configured for mounting on the structural support member,
wherein the body member and the bottom member are configured to form a cavity to slidingly receive a bottom edge of the first cable tray section and a bottom edge of the second cable tray section.

19. The device of claim 18, wherein the top member, the body member, and the bottom member are integrally formed from aluminum, steel, or stainless steel.

20. The device of claim 18, wherein an inside edge of the bottom member includes a protrusion extending therefrom at a position distal from the body member, and
wherein the body member, the inside edge of the bottom member, and the protrusion form the cavity for receiving the bottom edge of the first cable tray section and the second cable tray section.

* * * * *